United States Patent [19]

Manganelli

[11] 3,977,687
[45] Aug. 31, 1976

[54] HOLDER FOR HOLLOW ARTICLES

[75] Inventor: Alfredo Manganelli, Hohokus, N.J.

[73] Assignee: American Can Company, Greenwich, Conn.

[22] Filed: May 7, 1975

[21] Appl. No.: 575,372

[52] U.S. Cl. .............................. 279/2 R; 242/130.1; 269/48.1; 294/93
[51] Int. Cl.² ..................... B23B 31/00; B23B 31/40
[58] Field of Search ............. 279/2; 242/46.3, 46.6, 242/130, 130.1; 294/93; 269/48.1

[56] References Cited
UNITED STATES PATENTS

| 1,539,972 | 6/1925 | Todd | 242/130.1 |
| 2,437,100 | 3/1948 | Lambach | 242/130.1 |
| 2,574,285 | 11/1951 | Rea | 242/130.1 X |
| 3,314,714 | 4/1967 | Brubaker | 294/93 |

Primary Examiner—Othell M. Simpson
Assistant Examiner—Z. R. Bilinsky
Attorney, Agent, or Firm—Robert P. Auber; Ira S. Dorman; Thomas M. Galgano

[57] ABSTRACT

A holder for supporting a hollow article includes a base, a plurality of resilient fingers extending outwardly from the base, and restraining means for maintaining proper alignment of the fingers. The resilient characteristic and the design of the fingers permits the loading and stable seating of a hollow article presented in misalignment to the holder, and the holder is especially useful for supporting can shells which, because of the nature of the operations to be performed thereon, often cannot be externally supported.

14 Claims, 5 Drawing Figures

U.S. Patent   Aug. 31, 1976   3,977,687
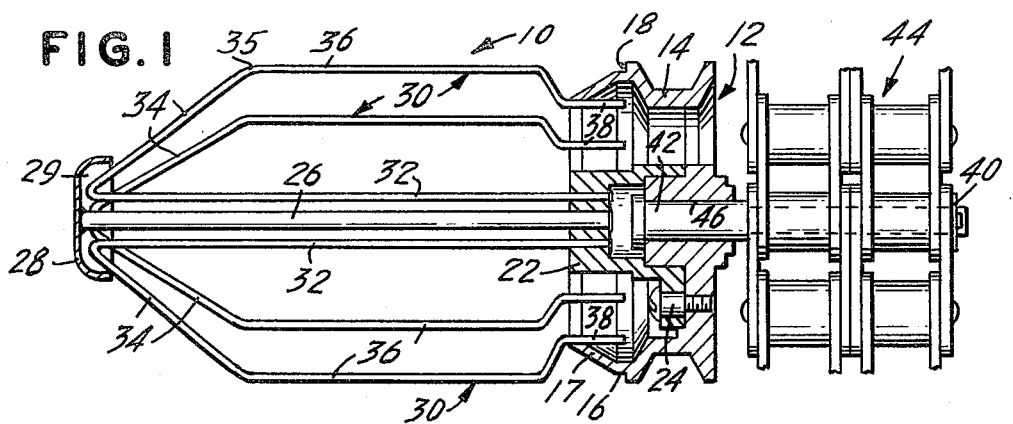
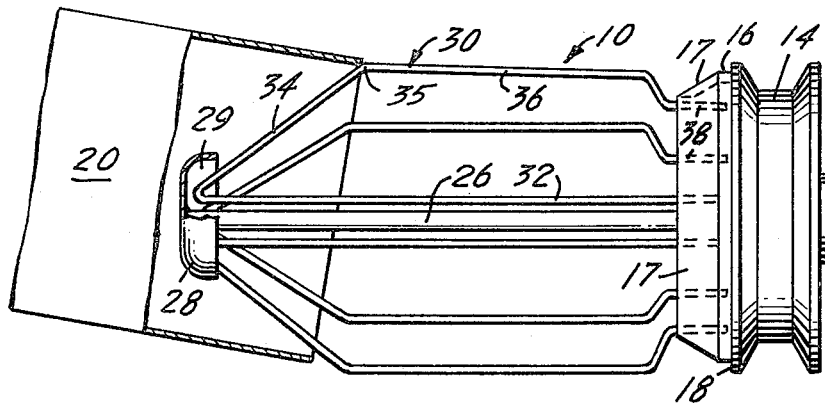
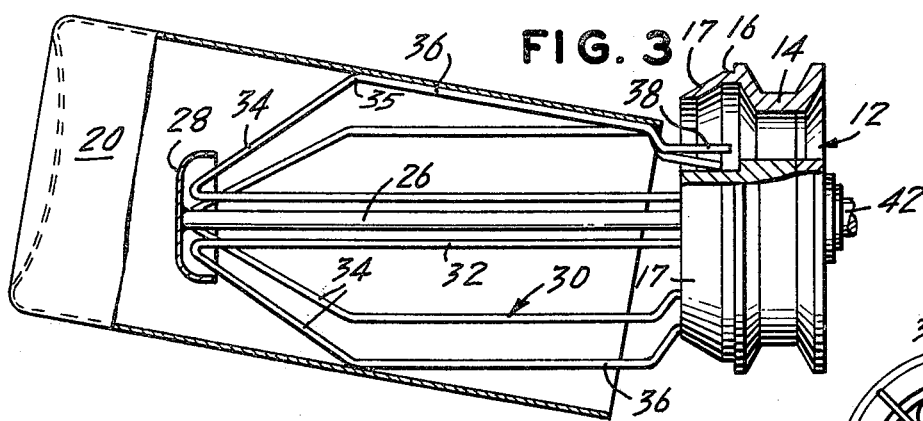
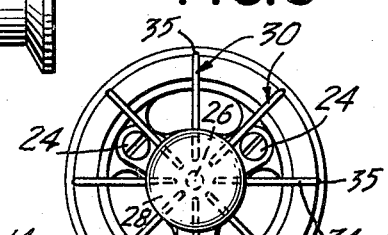
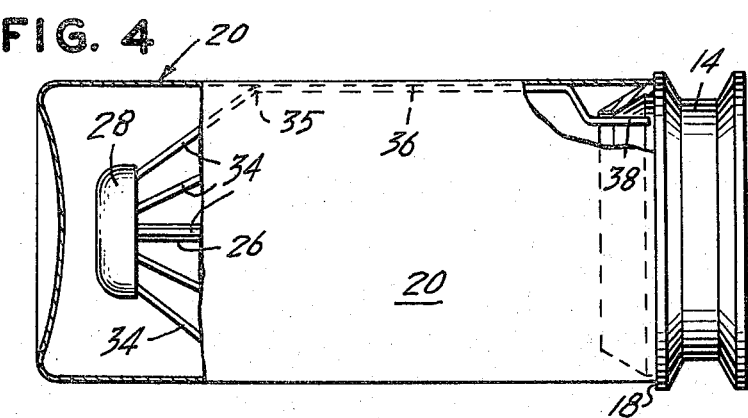

HOLDER FOR HOLLOW ARTICLES

BACKGROUND OF THE INVENTION

Various types of holders have in the past been employed to support wet (e.g., recently printed or coated) two-piece can shells during transport from place to place, such as through curing or drying ovens and the like. Typically, the shells were simply inserted over pins projecting outwardly from a conveyor; while very simple and convenient to load and unload, such systems provided little security of support, and offered no opportunity to rotate the shells on the holders, and little by way of precise position control.

The so-called "spider" holder of, for example, U.S. Pats. Nos. 3,157,406; 3,298,700 and 3,365,158, and the "brush" holder typified by U.S. Pat. No. 3,334,904 improved upon the noted deficiencies of the simple pin-type mounting. However, so far as is known, no presently-available holder for hollow articles offers adequate levels of support and position control, while also enabling efficient rotation of the mounted article. These features tend to be critical in connection with current ultraviolet light curing operations, wherein the relationships between the coated surface and the incident UV beam have a significant effect upon the results achieved. Finally, in present-day high-speed can printing and decorating operations, it is imperative that the holder be capable of accepting and releasing the shells rapidly and without damage to either the workpiece or the transporting equipment, and this must be done not only while affording the above-noted features, but also even in the event of misalignment of skewing of the shells as they are presented to the holders.

Accordingly, it is an object of the present invention to provide a novel holder on which a hollow article may be firmly supported in a relatively precise position, and readily rotated thereby.

It is also an object of the invention to provide such a holder upon and from which the article may be rapidly and facilely loaded and withdrawn, without damage to the aritcle or to the holder, and notwithstanding that the article be presented to the holder in an acute angular relationship to its axis.

A more specific object is to provide a novel holder having the foregoing features and advantages, which holder is simple and convenient to use, and is especially adapted for the efficient transport of can shells through a UV-curing system.

SUMMARY OF THE INVENTION

It has now been found that the foregoing and related objects of the invention are readily attained in a holder including a base and a plurality of resilient fingers extending outwardly therefrom and disposed about a common axis therewith. Each finger comprises a first element secured to the base and extending outwardly therefrom, a second element commencing adjacent the outer end of the first element and extending away from the common axis and generally toward the base, and a third element commencing adjacent the inner end of the second element and extending toward the base, with the first and third elements extending generally parallel to the common axis in the normal position of the fingers. At least a portion of the first element is resiliently deflectable relative to the base, to permit movement of the fingers from their normal position toward the common axis with the application of relatively slight force thereupon. The third element is also resiliently deflectable, relative to the first element associated therewith, with the application of relatively slight force thereupon, to permit further movement thereof toward the common axis. As a result, the fingers cooperatively permit loading of a hollow article upon the holder with the axis of the article at an acute angle to the common axis defined. Their resilient characteristic tends to cause the fingers to assume substantially their normal positions, within the mounted article, thereby cooperatively securely seating the article on the holder with the third elements of the fingers bearing upon the inner surfaces thereof. Restraining means extends outwardly from the base of the holder, and serves to engage the free inner end portions of the third elements there behind, thereby substantially maintaining the normal position of the fingers relative to the base in the absence of a mounted article.

Preferably, the fingers are fabricated from wire and are inherently resilient, with the elements thereof being integrally formed. Most desirably, each element of the fingers is substantially rectilinear, with the first and second elements forming an acute angle therebetween, and with the angle between the second and third elements being the complement thereof. The restraining means of the holder may advantageously comprise a continuous wall having an outer portion which is tapered toward the common axis. In such a case, the third element of the fingers will normally be provided with a free end portion which is offset in the direction of the common axis, relative to the remainder of the third element. The base is preferably circular in cross-section, to best adapt it for the mounting of cylindrical can shells. A shoulder is desirably formed at the intersection of the base and the restraining wall, which is dimensioned and configured to provide an abutment surface for the article against the base, and also to engage the rim of the mounted article, to thereby cooperate with the fingers for the secure support thereof.

In the particularly preferred embodiments, the holder additionally includes a shaft secured at one end to the base and extending axially outwardly therefrom, and a cap, having an inwardly-directed cavity, secured to the other end of the shaft. In this instance, the outermost portions of the fingers, at the intersection of the first and second elements, are disposed within the cavity of the cap. The cap thereby limits the movement of the fingers away from the post and prevents the entry of articles therebetween. It is also preferable that the exterior of the cap be curved to provide a relatively smooth contour over which the article may readily slide, to facilitate loading of seriously misaligned articles upon the holder. Finally, a support pin may be rotatably mounted in the base and may extend therefrom coaxially with the common axis in the opposite direction to that in which the fingers extend, to thereby provide means for rotatably affixing the holder on a transporting mechanism, such as a chain conveyor.

BRIEF DESCRIPTION OF THE DRAWINGS

FIG. 1 is a cross-sectional view taken along the longitudinal axis of a holder embodying the present invention, showing the holder in its normal horizontal position and with pin support means rotatably received in its base, and showing a fragmentarily-illustrated chain conveyor to which the pin support is attached.

FIG. 2 is a similar view of the holder, with a portion of the supporting pin broken away and showing the angular loading of a fragmentarily-illustrated can shell thereonto, loading being at tthe initial phase of the sequence;

FIG. 3 is a view comparable to the foregoing FIGURES, with the can shell at an intermediate phase of the loading sequence;

FIG. 4 is yet another similar view of the holder, showing the can shell fully mounted thereon; and FIG. 5 is an outer end view of the holder of the previous FIGURES, drawn to a reduced scale.

DETAILED DESCRIPTION OF THE ILLUSTRATED EMBODIMENT

Turning now in detail to the appended drawing, the holder, generally designated by the numeral 10, includes a circular base, generally designated by the numeral 12, having an inwardly-disposed pulley portion 14 and a restraining portion or circular wall 16 extending outwardly therefrom. A right angle shoulder 18 is defined at the junction of the pulley portion 14 and the wall 16, the annular inner surface of which provides a stop or abutment element, the short projecting circumferential surface of which provides a lateral rim-support element; these features will be more fully described hereinbelow. A hub member 22 is secured to the base 12 by screws 24, and supports a post 26, which extends axially outwardly therefrom. Secured to the outer end of the post 26 is a cap 28 having an inwardly-opening cavity 29 defined therein, the functions of which will also be discussed hereinafter.

Eight outwardly extending fingers, each being generally designated by the numeral 30, are affixed to the hub 22, and are disposed about the post 26 in radially and equidistantly spaced relation thereto. While the number of fingers 30 employed may be varied, eight appears to provide an optimum balance of rapidity and facility in loading and unloading, and stability and positional accuracy for the mounted article. Each of the fingers 30 is formed of a single length of resilient wire, and consists of a first rectilinear element 32 secured (such as by welding) to the hub 22 and extending outwardly therefrom, a second rectilinear element 34, extending reversely from the outer end of the first element 32 (typically with an angle of about 30°–40° therebetween), and a third element 36 continuing from the inner end of the second element 34 to a point near the base 12. In their normal, unloaded positions, the first and third elements extend generally parallel to the post 26.

The fingers 30, in effect, cooperatively define a collapsible mandrel in which the elements resiliently deform or deflect to accommodate the article during loading, and thereafter expand to resume substantially their normal positions, with the third elements 36 of the fingers bearing upon the inner surface of the article. Deflection occurs primarily in the first and third elements due, in the illustrated embodiment, to the inherent resiliency of the material from which the fingers are fabricated (e.g., spring steel). Thus, the outermost portion of the first element 32 flexes relative to the innermost end thereof, which is secured to the base 12, while deflection of the third element 36 occurs primarily through movement in the angle bends at the ends (primarily the outermost end) of the second element 34. As will be appreciated, some movement may also occur in the second element 34 relative to the first 32 and third 36, but it is the deflection of the latter-mentioned two elements which is believed to be essentially responsible for the advantageous loading and unloading features of the holder. That is, such movement, coupled with the configuration of the fingers 30, is believed to permit loading over a range of angles of approach between the axes of the article and of the holder 10, without marring or otherwise damaging the article; it also contributes to the secure and precise seating of the fully mounted article, and to the facile unloading thereof from the holder 10.

The base 12 has an axial bore 46, which rotatably receives a support pin 42. The pin 42 is secured to a chain conveyor 44 by an appropriate mounting fixture 40 secured thereto. The pulley portion 14 of the holder 10 is designed to engage a stationary member (not shown) during passage thereby, to cause rotation of the holder 10 on the pin 42, as desired.

FIGS. 2–4 of the drawing illustrate the sequence of loading of a can shell, generally designated by the numeral 20, upon the holder 10. Although not illustrated, a multiplicity of holders will generally be mounted along the length of a suitable transporting mechanism, such as a chain conveyor, with the can shells being presented thereto from a turret, around which the shells may be mounted and supported, such as by vacuum holding devices. The transfer is conveniently effected simply by so disposing the chain conveyor that it converges toward the turret, with the design of the parts and the operation thereof being such that the holders are gradually inserted into successive can shells as the latter are carried about the turret, as a result of the converging relationship. While such continuous transfer is obviously convenient, the angular relationship between the conveyor and the turret necessitates the use of holders which are capable of receiving shells presented to them at an angle. Moreover, since high convergence rates (i.e., large angular relationships) will enable loading in less distance, and hence at higher speeds, such angles (between the conveyor and the turret, and therefore between the holders and the shells, since mountings are normally perpendicular) will generally be of a significant magnitude, and may be as great as 20°or more. This, in turn, has necessitated the development of the novel holder herein described.

As can be seen in FIG. 2, the shell 20 is (in what has been found to be an ideal case) presented to the holder with an angle of about 10° between their axes. At this angle of approach, the shell 20 initially contacts one or more of the fingers 30 at or just outwardly of the knuckle or angle bend 35 between their respective second and third elements 34, 36. Initial impact is accommodated essentially by lateral movement of the outermost portion of the first element 32 from its normal position (shown in FIG. 1), but some displacement of the third element 36 will usually accompany movement of the first.

As loading proceeds, the shell 20 moves further onto the holder 10, with the fingers 30 deflecting as necessary; an intermediate phase of the sequence is shown in FIG. 3. Due to the relative rigidity of the means by which the shell 20 is supported during loading (not shown), the angular relationship between it and the holder 10 remains substantially constant, until the shell 20 is released from its support. However, it may be desirable to employ a non-rigid supporting member for the shell, in which case the axis of the shell with approach that of the holder during the loading operation.

When the shell 20 has been advanced on the holder 10 to a position in which its rim lies closely adjacent the circular restraining wall 16 of the base 12, the shell 20 is released by its support (for example, by breaking the vacuum of a suction holder), whereupon the biasing force of the deflected fingers 30, in resuming substantially their normal positions, orient the shell 20 to a generally coaxial position thereon. Finally, to positively seat the shell, it is advanced on the holder a small distance (by means not shown) until its rim abuts against the annular inner surface of the shoulder 18; when so mounted (as seen in FIG. 4), the short circumferential surface of the shoulder 18 lies within the shell 20 in close conformity to its rim, thereby affording considerable lateral support. Hence, the wall 16 cooperates with the fingers 30 to securely mount the shell 20 on the holder 10, it being appreciated that the third elements 36 of the fingers 30 bear uniformly upon the inner surface of the shell 20, and thereby lend stability and support to the so mounted shell.

To ensure smooth advancement of the shell 20 onto the wall 16, and to otherwise maintain proper alignment of the fingers 30 relative thereto, the third elements 36 of the fingers 30 are provided with radially offset portions 38 near their free ends 40, which portions 38 engage behind the wall 16. In the absence of wall 16, the third elements 36 would extend away from the post 26 in a non-parallel relationship (since force tending to urge them to such positions is necessary to ensure that the elements 36 bear upon the mounted shell), thus hampering facile loading and rendering uncertain the application of uniform force upon the mounted shell. Moreover, so disposing the free ends of the fingers guides the shell onto the wall 16, as does the tapered portion 17 of the latter.

The function of the post 26 and end-mounted cap 28 thereon is two-fold; i.e., to assist in maintaining the desired positions of the fingers 30, and to prevent the entry of shells therebetween during loading. The outer ends of the fingers 30 must, of course, be free to move, and the cavity 29 with the cap 28 is well-suited to permit such movement while performing the two-fold function described. The outer surface of the cap 28 has a smoothly rounded configuration to minimize any chance of damage to can shells coming into contact with it. In that regard, it should be noted that the cap configuration also extends somewhat the range of permissible angles of shell approach, by providing a smooth sliding surface over which seriously misaligned can shells can pass, without undue interference, to ultimate successful mounting on the holder.

The appropriate dimensions and relationships of the several parts of the holder are primarily dependent upon two criteria, i.e., the dimensions and configuration of the article to be mounted thereon, and the angle of loading involved. As has been suggested, the distance between diametrically opposed contacting surfaces of the third elements, in their normal, fully-extended positions, should be at least slightly greater than the inside diameter of the article, to ensure that the elements bear firmly upon the inner surface of the article when it is mounted. Additionally, as can best be appreciated from FIG. 4, the distance between the cap 28 (or, where no cap is used, the outer ends of the fingers 30) and the shoulder 18 should be small enough to prevent contact of such outer parts of the holder upon an end wall of the article (e.g., a can shell), for obvious reasons.

In a specific instance, a holder was fabricated to transport two-piece can shells having an inside diameter of 2 and nine-sixteenths inches and a height of 5 and one-quarter inches. The lengths of the first, second and third elements of the fingers were approximately 4 and three-eighths, 1 and five-eighths and 3 and one-quarter inches, respectively, and the angle between the first and second elements was about 35°. The distance between the end of the center post cap and the abutment surface of the right-angle shoulder of the base was about 4 and three-quarter inches, and the diameter of the lateral rim-support surface of the shoulder was about equal to that of the shell; in the normal position of the fingers, the diametrical distance therebetween was slightly more than the shell diameter. In addition, the third elements of the fingers were free to move through a maximum angle of about 10° in the space between the circular wall and the hub.

Using a series of the foregoing holders mounted on a chain conveyor, which approached a shell decorator turret at an angle of about 10° (mountings being such that the angle between the shells and the holders was also 10°), shells were readily loaded at a rate of about 800 per minute. There was virtually no scratching, marring or other damage to the shells or the transfer equipment, and no jamming, misloading or other malfunction occurred. The holders were found to be capable of receiving shells at angles of approach ranging from about 0° to 17°, with a 10° relationship being optimum due, it is believed, to the 10° angle of convergence of the conveyor toward the turret, as well as the 10° maximum angle of free travel of the third element, discussed above.

Thus, it can be seen that the present invention provides a novel holder on which hollow articles may be firmly supported in a relatively precise position, and readily rotated thereby. Articles may be rapidly and facilely loaded upon and withdrawn from the holder, without damage to the article or to the holder and notwithstanding that the articles are presented to the holder in an acute angular relationship to its axis. In addition, the holder is simple and convenient to use, and is especially adapted for the efficient transport of can shells through a UV-curing system.

I claim:
1. A holder for supporting a hollow article having an open end, comprising:
   a base;
   a plurality of fingers extending outwardly from said base and disposed about a common axis therewith, each of said fingers having a first element secured to said base and extending outwardly therefrom, a second element commencing adjacent the outer end of said first element and extending away from said axis and generally toward said base, and a third element commencing adjacent the inner end of said second element and also extending toward said base and having a free inner end portion, said first and third elements extending generally parallel to said axis in the normal position of said fingers, with at least a portion of said first elements being resiliently deflectable relative to said base to permit movement of said fingers from said normal position thereof toward said common axis with the application of relatively slight force thereupon, and said third elements being resiliently deflectable relative to said first elements associated therewith, with the application of relatively slight force thereupon to permit further movement thereof toward said common axis, said fingers thereby cooperatively per- mitting loading of an article at an acute angle to said common axis, and the resilient characteristic of said elements thereof tending to cause said fingers to assume substantially said normal position after loading of the article, thereby cooperatively securely seating the mounted article thereon with said third elements bearing upon the inner surface of the article; and restraining means extending outwardly from said base and normally engaging the free inner end portions of said third elements therebehind, to thereby substantially maintain said normal position of said fingers relative to said base in the absence of a mounted article.

2. The holder of claim 1 wherein each of said elements is substantially rectilinear, with said first and second elements having an acute angle therebetween, and with said second and third elements having the complementary angle to said acute angle therebetween.

3. The holder of claim 1 wherein said retaining means comprises a continuous wall having an outer portion which is tapered toward said common axis, and wherein said free inner end portion of each of said third elements is offset toward said common axis relative to the remainder of said third element.

4. The holder of claim 3 wherein a shoulder is defined at the intersection of said base and said wall, said shoulder being dimensioned and configured to provide an abutment surface for the article against said base, and to engage the rim at the open end of the fully loaded article to cooperate with said fingers for the secure support thereof.

5. The holder of claim 4 wherein said base is generally circular, and wherein said common axis is coaxial therewith.

6. The holder of claim 1 additionally including a support pin rotatably mounted in said base, and extending from said base coaxially with said common axis in the opposite direction to that in which said fingers extend.

7. A holder for supporting a generally cylindrical hollow article having an open end, comprising:
a base;
a post having one end secured to said base and extending outwardly therefrom;
a cap secured to the other end of said post and having an inwardly-directed cavity therein;
a plurality of fingers extending outwardly from said base and disposed in radially and equidistantly spaced relation to said post, each of said fingers having a first element secured to said base and extending outwardly therefrom, a second element commencing adjacent the outer end of said first element and extending away from said post and generally toward said base, and a third element commencing adjacent the inner end of said second element and also extending toward said base and having a free inner end portion, said first and third elements extending generally parallel to said post in the normal position of said fingers, with at least a portion of said first elements being resiliently deflectable relative to said base to permit movement of said fingers from said normal position thereof toward said post, with the application of relatively slight force thereupon, and said third elements being resiliently deflectable relative to said first elements associated therewith, with the application of relatively slight force thereupon, to permit further movement thereof toward said post, said fingers thereby cooperatively permitting loading of an article at an acute angle to said post, and the resilient characteristic of said elements thereof tending to cause said fingers to assume substantially said normal position after loading of the article, thereby cooperatively securely seating the mounted article thereon with said third elements bearing upon the inner surface of the article, the outermost portions of said fingers, at the intersection of said first and second elements thereof, being disposed within said cavity of said cap, with said cap thereby limiting movement of said fingers away from said post and preventing the entry of articles therebetween; and restraining means extending outwardly from said base and normally engaging the free inner end portions of said third elements therebehind, to thereby maintain, in cooperation with said cap, said normal position of said fingers relative to said base in the absence of a mounted article.

8. The holder of claim 7 wherein each of said elements is substantially rectilinear, with said first and second elements having an acute angle therebetween, and with said second and third elements having the complementary angle to said acute angle therebetween.

9. The holder of claim 8 wherein said fingers are fabricated from wire and are inherently resilient, with said elements thereof being intergrally formed.

10. The holder of claim 7 wherein said retaining means comprises a continuous wall having an outer portion which is tapered toward said common axis, and wherein said free inner end portion of each of said third elements is offset toward said common axis relative to the remainder of said third element.

11. The holder of claim 10 wherein a shoulder is defined at the intersection of said base and said wall, said shoulder being dimensioned and configured to provide an abutment surface for the article against said base, and to engage the rim of the mounted article to cooperate with said fingers for the secure support thereof.

12. The holder of claim 11 wherein said base is generally circular, and wherein said common axis is coaxial therewith.

13. The holder of claim 7 additionally including a support pin rotatably mounted in said base, and extending from said base coaxially with said common axis in the opposite direction to that in which said fingers extend.

14. The holder of claim 7 wherein the exterior of said cap is curved to provide a relatively smooth contour over which the article may readily pass, to facilitate loading of seriously misaligned articles upon said holder.

* * * * *